United States Patent [19]

Kamada et al.

[11] Patent Number: 4,590,230

[45] Date of Patent: May 20, 1986

[54] ADHESIVE COMPOSITION FOR CERAMIC TILES

[75] Inventors: Keiichi Kamada, Kamakura; Katuaki Iiyama, Odawara; Yasushi Yano, Kawasaki; Isao Itoh, Ichikawa, all of Japan

[73] Assignee: Mitsui Toatsu Chemicals, Incorporated, Tokyo, Japan

[21] Appl. No.: 647,070

[22] Filed: Sep. 4, 1984

[51] Int. Cl.$^4$ .................... C08K 5/00; C08F 294/00
[52] U.S. Cl. .................... 524/77; 524/262; 524/263; 524/265; 524/270; 524/271; 524/272; 524/273; 524/274; 526/238.3
[58] Field of Search ............ 527/600; 526/238.3; 524/77, 262, 263, 265, 270, 271–274

[56] References Cited

U.S. PATENT DOCUMENTS

| | | | |
|---|---|---|---|
| 3,412,061 | 11/1968 | Drukker | 524/77 |
| 3,427,269 | 2/1969 | Davis et al. | 524/271 |
| 3,970,623 | 7/1976 | Feeney et al. | 524/272 |
| 4,018,732 | 4/1977 | Lakshmanan | 524/272 |
| 4,189,419 | 2/1980 | Takemoto et al. | 524/272 |
| 4,280,942 | 7/1981 | Green | 524/271 |
| 4,419,481 | 12/1983 | Schwartz | 524/272 |
| 4,463,120 | 7/1984 | Collins et al. | 524/270 |

FOREIGN PATENT DOCUMENTS 152074  9/1983  Japan .

OTHER PUBLICATIONS

Warson, Applications of Synthetic Resin Emulsions, Ernest Benn, London (1972) pp. 108–115.
Encyclopedia of Polymer Science & Technology, vol. 5, John Wiley & Sons, N.Y. (1966) pp. 816–818.
Kitano et al, Jour. Appl. Biochem. 4, 34–40 (1982).
Kitano et al, Macromolecules, vol. 16, No. 8, pp. 1306, 1307 and 1310 (1983).

*Primary Examiner*—Herbert S. Cockeram
*Attorney, Agent, or Firm*—Fisher, Christen & Sabol

[57] ABSTRACT

Disclosed herein is an adhesive composition which contains specific amounts of (A) an aqueous emulsion, (B) a filler and (C) a resin solution of a resinous tackifier dissolved in a solvent and/or plasticizer. The adhesive composition has a fast setting time in adhesion strength and excellent water-proofness and hence produces superb adhesion force even when applied to a fresh mortar base which has been aged insufficiently.

19 Claims, No Drawings

ADHESIVE COMPOSITION FOR CERAMIC TILES

BACKGROUND OF THE INVENTION (a) Field of the Invention

This invention relates to a novel adhesive composition which contains an aqueous emulsion as its principal component and is suitable for ceramic tiles.

(b) Description of the Prior Art

Adhesive compositions for ceramic tiles (hereinafter called "emulsion adhesives") containing an aqueous emulsion have conventionally been required to emulsify a resinous tackifier, one of their components, with a surfactant so as to mix the resinous tackifier in the aqueous emulsion, or to render a part of the resinous tackifier soluble in water or to subject the resinous tackifier to some treatment such as carboxylation so as to permit easy mixing of the resinous tackifier with the aqueous emulsion.

Such emulsion adhesives are of the single-pack type and can thus be used immediately after removal from the can. They can be used to apply ceramic tiles readily not only on such bases as mortar but also on smooth surfaces such as on new types of building materials such as plywood, gypsum wallboard and slate which are base materials difficult to apply ceramic tiles thereon by the conventional adhesion method relying upon cement and have thus not been used as bases for ceramic tiles. These adhesives are also free from pollution because they are aqueous emulsions. Therefore, emulsion adhesives have been used extensively in applying indoor tiles. However, adhesives of this sort have poor waterproofness compared with conventional cement-base adhesives and have resulted in separation of indoor ceramic tiles where water is often splashed, such as in bathrooms, to say nothing of outdoor ceramic tiles. In addition, these emulsion adhesives are not fully effective until water, which is contained in the adhesives, sufficiently evaporates or penetrates into bases so as to dry the adhesives. With mortar as a base, it has been impossible to apply tiles thereon when the mortar has not sufficiently aged or fully dried. Further, it has been impossible to use the above emulsion adhesives for such tiles which do not absorb water at all as porcelain tiles or cold-proof tiles.

In response to the recent move toward higher-grade construction, a variety of tiles are often used for both indoor and outdoor applications. To reduce labor and simplify applications, greater use of the above emulsion adhesives is desirable. There has thus been an urgent need for an improvement in the waterproofness of emulsion adhesives in order to permit their use in bathrooms and showerrooms and in their increased applicability to insufficiently-aged fresh mortar bases and to non-hygroscopic tiles such as porcelain tiles and cold-proof tiles in order to prevent tile cracking and breakage due to frost in cold climates.

SUMMARY OF THE INVENTION

An object of this invention is to provide an adhesive for ceramic tiles, which adhesive contains an aqueous emulsion as its principal component and has a fast setting time in adhesion strength and excellent waterproofness and hence produces superb adhesion force even when applied to insufficiently-aged fresh mortar.

The present inventors have found that an adhesive composition which is obtained by mixing a resin solution containing a resinous tackifier, one component of an emulsion adhesive, dissolved in a solvent and/or plasticizer directly with an aqueous emulsion or a dispersion of an aqueous emulsion and filler without addition of any surfactant upon dispersing the resinous tackifier, is extremely effective.

The present invention therefore provides an adhesive composition for ceramic tiles, which composition comprises:

(A) an aqueous emulsion;
(B) a filler in an amount of 50–350 parts by weight on a solid basis per 100 parts by weight on a solid basis of the aqueous emulsion;
(C) a resin solution in an amount of 20–250 parts by weight on a non-volatile component basis per 100 parts by weight on a solid basis of the aqueous emulsion, said resin solution containing a resinous tackifier dissolved in a solvent and/or plasticizer.

DETAILED DESCRIPTION OF THE INVENTION

The term "aqueous emulsion" as used herein means an aqueous dispersion of a natural or synthetic polymer which is known per se in the art. Specific examples of such an aqueous emulsion include liquid dispersions of homopolymers or copolymers of at least one polymerizable unsaturated monomer selected from styrene, styrene derivatives, maleic acid, maleic acid derivatives, acrylonitrile, butadiene, chloroprene, isoprene, isobutene, isobutylene, acrylic acid and its esters, methacrylic acid and its esters, vinyl acetate, ethylene, vinyl chloride and vinylidene chloride, or natural rubber latexes.

Among the above-exemplified emulsions, it is preferable to use a synthetic rubber latex such as styrene-butadiene synthetic rubber latex or methyl methacrylate-butadiene synthetic rubber latex, or an acrylic emulsion containing a copolymer of at least two monomers selected from acrylic acid or its esters and methacrylic acid or its esters, or a copolymer of acrylic acid or its esters and methacrylic acid or its esters with a monomer copolymerizable therewith, the resin component in said emulsion amounting to 40–65 wt. %.

It is also desirable to use a latex or aqueous emulsion of a synthetic rubber polymerized by reducing the amount of surfactant to be used to a significant extent or by excluding the surfactant. Such a latex or aqueous emulsion may be used in combination without developing any problems or inconvenience.

As the filler, an inorganic filler such as calcium carbonate, clay, talc and asbestos or a fibrous filler such as pulp can be exemplified.

Exemplary resinous tackifiers may include rosin, modified rosins and their derivatives, polyterpene resins, modified terpenes, aliphatic hydrocarbon resins, aromatic hydrocarbon resins, phenol resins, xylene resins and coumarone-indene resins. As representative examples of such resinous tackifiers, may be mentioned "Ester Gum", "Rosin" and "Wood Rosin" [trademarks; products of Arakawa Kagaku K. K.]; "Hi-Rosin" [trademark; product of Yasuhara Yushi K. K.]; and "Staybelite" and "Pentalyn" [trademarks; products of Hercules Incorporated] as rosin-base resinous tackifiers. Exemplary terpene-base resins may include "YS-Resin" and "YS-Polystar" [trademarks; products of Yasuhara Yushi K. K.] and "Quintone" [trademark; product of Nippon Zeon Co., Ltd.]. As aliphatic hydrocarbon resins, may be mentioned "Hi-Rez" and "Tack Ace" [trademarks; products of Mitsui Petrochemical Industries, Ltd.] and "Alcon" [trademark; product of Arakawa Kagaku K. K.]. Aromatic hydrocarbon resins may include "Petrosin" [trademark; product of Mitsui Petrochemical Industries, Ltd.], "Nisseki Neopolymer" [trademark; product of Nippon Petrochemicals Co., Ltd.] and "Petrol" [trademark; product of Toyo Soda Mfg. Co., Ltd.]. In addition, "Tamanol" [trademark; product of Arakawa Kagaku K. K.], "Nikanol" [trademark; product of Mitsubishi Gas Chemical Co., Inc.] and "National Xylylene" [trademark; product of Matsushita Electric Works, Ltd.] may be mentioned as phenol or xylene resins.

Since the above resinous tackifiers have different miscibility with aqueous emulsions due to differences in their principal resin structures, it is preferred to use them in a suitable combination in view of the composition of each aqueous emulsion. The softening points of these resinous tackifiers may vary over a wide range, including those liquid at room temperature to those having a melting point of about 150° C. It is, however, preferred to combine the resinous tackifiers to obtain a mixed tackifier having a softening point in the range of 80° C.-130° C. or so, since such a mixed tackifier can bring about relatively good results.

Any solvents and plasticizers may be used as long as they are miscible with the above resinous tackifiers. Any solvents and plasticizers which are not compatible with such resinous tackifiers when used individually, may still be used as long as they are compatible with the resinous tackifiers when used in combination. Exemplary plasticizers include phthalic acid esters such as dioctyl phthalate and dibutyl phthalate, polyester-base plasticizers, petroleum fractions and residues having high boiling points and styrene-xylene copolymers. Exemplary solvents include aromatic solvents such as benzene, toluene and xylene, naphthenic solvents, paraffinic solvents, ketones or esters.

When mixing the aqueous emulsion (A), filler (B) and resinous tackifier solution (C) together, it may be feasible to disperse the filler (B) in the aqueous emulsion (A) so as to prepare a slurry in advance and then to add the resinous tackifier solution (C) to the slurry; or, alternatively, to add the resinous tackifier solution (C) in advance to the aqueous emulsion (A) to form a mixed emulsion and then to disperse the filler (B) in the mixed emulsion.

When mixing the above components, the filler (B) and the resinous tackifier solution (C) are used in amounts of 50-350 parts by weight (on a solid basis) and 20-250 parts by weight (on a non-volatile component basis), respectively, per 100 parts by weight (on a solid basis) of the aqueous emulsion (A).

Preferably, the filler (B) and the resinous tackifier solution (C) may be mixed in amounts of 150-350 parts by weight and 25-200 parts by weight, respectively, per 100 parts by weight of the aqueous emulsion (A). Further, the resinous tackifier may be contained in an amount of 12-150 parts by weight or preferably 15-120 parts by weight, per 100 parts by weight of the aqueous emulsion (A), in the resinous tackifier solution (C).

Regarding the relative proportions of the components (A), (B) and (C) in the present invention, the adhesive composition has poor adhesiveness and hence provides poor workability when tiles are applied, the resulting adhesion of the tiles to the base is weak, and the waterproofness of the present invention is unsatisfactory, if the resin solution (C) is contained in any amount less than 20 parts by weight per 100 parts by weight of the aqueous emulsion. If the resin solution (C), on the other hand, is contained in any amount more than 250 parts by weight, it becomes difficult to disperse the resin solution (C) in the dispersion of the aqueous emulsion and filler, thereby causing the resin solution (C) to rise as oil droplets to the surface or breaking down the emulsion and hence failing to maintain the emulsion in a stable state.

If the filler (B) is incorporated in any amount less than 50 parts by weight, it is impossible to achieve high thixotropy which is indispensable for tile adhesives and the resulting adhesive composition has poor workability. Any amount more than 350 parts by weight, on the contrary, renders the resulting adhesive compositions dry and crumbly and thus leads to too high thixotropy. The resulting adhesive compositions dries up too fast, thereby resulting in poor workability and low adhesion forces.

In addition to the above three components, it may also be feasible to incorporate a thickening agent or other additive in order to make the adhesive composition of this invention easier to use as a tile adhesive. For example, it may be preferred to add a small amount of a silane-base coupling agent or colloidal silica to the adhesive composition of this invention since such an extra additive can improve its heat resistance and waterproofness.

As exemplary organosilane compounds useful for the above coupling agent, may be mentioned those containing per molecule at least one substituent group capable of yielding a silanol group upon its hydrolysis such as a methoxy group, ethoxy group, $\beta$-methoxyethoxy group or a chlorine atom and also, in the same molecule, at least one reactive group capable of undergoing chemical bonding with an organic material such as a vinyl group, glycidyl group, methacrylic group, amino group and mercapto group. As specific examples of such organosilane compounds, may be mentioned vinyl trichlorosilane, vinyl triethyoxysilane, vinyl tris($\beta$-methoxyethoxy)silane, $\gamma$-glycydoxypropyl trimethoxysilane, $\gamma$-methacryloxypropyl trimethoxysilane, N-$\beta$(aminoethyl)$\gamma$-aminopropyltrimethoxysilane, $\gamma$-chloropropyl trimethoxysilane, $\gamma$-mercaptopropyl trimethoxysilane and $\gamma$-aminopropyl triethoxysilane.

Further, use of a surfactant may be acceptable upon preparation of an adhesive composition according to this invention, as long as it is used in a small amount as a stabilizer in the course of the polymerization of the aqueous emulsion or when adding and mixing a filler and resinous tackifier solution with the aqueous emulsion. It is, however, preferred to limit the amount of the surfactant to 0.5% or less based on the amount of the adhesive composition of this invention. At the above level, the surfactant does not emulsify the resinous tackifier solution and, at the same time, does not deleteriously affect the formation of membranes from the aqueous emulsion. Since ceramic tiles may be applied without need of any surfactant in the present invention, the workability of the adhesive composition upon application of tiles or the storage stability of the adhesive composition is not impaired.

The adhesive composition containing the above components in suitable proportions as mentioned above has a faster setting time in adhesion force than conventional emulsion adhesives for tiles. In particular, it produces an adhesion force promptly even when applied to a fresh mortar base aged insufficiently, having a high water content and incapable of absorbing additional water, and exhibits excellent post-hardening waterproofness and adhesion force compared with conventional products.

As described above, the adhesive compositions according to this invention are extremely useful as adhesives for ceramic tiles.

The present invention will hereinafter be described more specifically in the Examples and Comparative Examples below. It should, however, be borne in mind that the present invention is not limited to or by the Examples. All designations of "part" or "parts" and "%" hereinafter are by weight, unless otherwise specifically indicated.

EXAMPLE 1

As an aqueous emulsion (A), a latex of a styrene(ST)-butadiene(BD) synthetic rubber [ST/BD=45/55 (by weight ratio); acrylic acid: 2%; resin content: 50%) was prepared by the emulsion polymerization process. Ninety parts of calcium carbonate were added with stirring to 100 parts of the latex to obtain a slurry.

Separately, 5 parts of dioctyl phthalate, 10 parts of toluene and 5 parts of xylene were added to 40 parts of "Hi-Resin #90" [trademark; product of Toho Kagaku K. K.] as a resinous tackifier. The resultant mixture was stirred under heat to prepare a resin solution (C). After lowering the temperature of the resin solution below 50° C., 60 parts of the thus-cooled resin solution was slowly added while stirring to 190 parts of the above-obtained slurry, followed by the addition of 15 parts of water in order to adjust the resin content. Finally added was 0.5 part of "Hi-Metlose" [trademark; product of Shin-Etsu Chemical Co., Ltd.], a commercially-available cellulose-base thickening agent. After stirring the resultant mixture thoroughly, the mixture was thickened with a 10% aqueous solution of caustic soda to obtain a tile adhesive having a viscosity of 16,000 poises and a non-volatile content, inclusive of the resin components, of 70%.

Next, the thus-prepared tile adhesive was coated, using a comb-shaped trowel which had been designed exclusively for coating adhesives on tiles, on a flat slate board 8 mm thick (coat weight: about 1 kg/m²) and an "SP-30" tile [trademark; indoor earthenware tile produced by Ina Seito Co., Ltd.] was immediately applied on the thus-coated adhesive layer. The adhesive was then allowed to age for 2 weeks in a room maintained at 20° C., followed by a one-week immersion in water at 20° C. Then, an iron jig designed for tensile tests was attached to the surface of the tile on the resultant test panel and the tensile strength was measured while the test panel was still wet.

Separately, mortar which had been prepared by mixing cement and sand in a ratio of 1:3 and adding a suitable amount of water to the resultant mixture was coated on a paving block plate to a thickness of 10 mm to form a mortar base. While allowing the mortar base to age in a room controlled at 20° C., the above adhesive was coated on the mortar base in the same manner as described above and tiles similar to those employed above were applied two times, once 4 days after, and again 7 days after the preparation of the mortar base. After application of the tiles, the adhesive was allowed to age at 20° C. for 2 weeks in the same manner as in the above experiment. The tiles were then immersed together with the mortar base and adhesive for 1 week in water at 20° C., followed by a tensile test using a tensile testing machine. Results are shown in Table 2.

EXAMPLE 2

To 100 parts of the styrene-butadiene synthetic rubber latex prepared in Example 1, were slowly added while stirring 60 parts of the resin solution prepared in Example 1. Thereafter, 90 parts of calcium carbonate and 15 parts of water, as used in Example 1, were added. Finally, the same thickening agent and caustic soda as those used in Example 1 were added to obtain a tile adhesive having a viscosity of 15,800 poises and a non-volatile content, inclusive of the resin components, of 70%.

In other words, Example 2 was conducted using exactly the same materials as Example 1 but adding them in an order different from that followed in Example 1. The thus-applied tiles were evaluated in the same manner as in Example 1.

EXAMPLE 3

By the emulsion polymerization process, there was prepared a methyl methacrylate(MMA) - butadiene synthetic rubber latex [MMA/BD=50/50 (by weight ratio); itaconic acid: 1.5%; resin content: 50%). Twenty parts of calcium carbonate were added with stirring to 100 parts of the latex, followed by the addition of 51 parts of the same resin solution as that prepared in Example 1. Thereafter, 67 parts of asbestos were further added and the resulting mixture was stirred thoroughly. Finally, the same thickening agent as that employed in Example 1 and caustic soda were added to obtain a tile adhesive having a viscosity of 16,800 and a non-volatile content, inclusive of the resin components, of 73%. The tile adhesive was evaluated in the same manner as in Example 1.

EXAMPLE 4

An acrylic emulsion was prepared as an aqueous emulsion, in accordance with a method known per se in the art, by combining 60 parts of 2-ethylhexyl acrylate (2-EHA), 36 parts of methyl methacrylate, 2 parts of N-methylolacrylamide(N-MAM), 2 parts of acrylic acid and 0.5% of an emulsifier. Its resin content was 45%.

Ten parts of naphthene oil ["Sunsen 450"; trademark: product of Sun Oil Corporation], 15 parts of toluene and 5 parts of xylene were added to 50 parts of a resinous tackifier ["Hi-Rez"; trademark: product of Mitsui Petrochemical Industries, Ltd.]. The resultant mixture was stirred under heat to prepare a resin solution. After cooling the resin solution to 50° C. or lower, it was slowly added to 100 parts of the above-prepared acrylic emulsion, followed by the addition with stirring of 110 parts of calcium carbonate and 18 parts of water. Thereafter, a thickening agent and caustic soda were further added to obtain a tile adhesive having a viscosity of 12,000 poises and a non-volatile content, inclusive of the resin components, of 70%.

The tile adhesive was evaluated in the same manner as in Example 1.

EXAMPLE 5

An acrylic emulsion having the composition below was prepared as an aqueous emulsion in accordance with the so-called soap-free polymerization process [butyl acrylate(BA): 65 parts, styrene: 30 parts, N-methylolacrylamide: 2 parts, acrylic amide: 1 part, and acrylic acid: 2 parts; resin content: 45%]. While stirring 100 parts of the emulsion, 100 parts of calcium carbonate were added, followed by the addition of 80 parts of the resin solution prepared in Example 4 and the further addition of 20 parts of water. Thereafter, a thickening agent and caustic soda were added to obtain a tile adhesive having a viscosity of 13,500 poises and a non-volatile content, inclusive of the resin components, of 68%.

EXAMPLE 6

There was prepared by the so-called soap-free polymerization process an acrylic emulsion having a resin content of 45% from 59 parts of 2-ethylhexyl acrylate, 35 parts of vinyl acetate, 2 parts of N-methylolacryamide, 0.5 part of divinylbenzene(DVB), 3.0 parts of acrylic acid and 0.5 part of hydroxyethyl acrylate(-HEA).

In addition, a resin solution was prepared by stirring under heat 50 parts of a resinous tackifier ["Tack Ace"; trademark: product of Mitsui Petrochemical Industries, Ltd.], 5 parts of naphthene oil as in Example 4, 15 parts of toluene and 10 parts of xylene.

To 100 parts of the above-prepared acrylic emulsion, 120 parts of calcium carbonate were added with stirring to prepare a slurry. In addition, 80 parts of the above-prepared resin solution were also added to the slurry, followed by the further addition of 24 parts of water. Then, a thickening agent and caustic soda were added to obtain a tile adhesive having a viscosity of 14,000 poises and a non-volatile content, inclusive of the resin components, of 69%.

The tile adhesive was evaluated in the same manner as in Example 1.

EXAMPLE 7

To 100 parts of the tile adhesive prepared in Example 6, was added 1 part of an aqueous solution containing 30% of non-ionic surfactant "Emulgen 920" [trademark; product of Kao Atlas K. K.]. This tile adhesive contained 0.3% of the non-ionic surfactant.

The resultant tile adhesive was evaluated in the same manner as in Example 1.

COMPARATIVE EXAMPLE 1

Using the same aqueous emulsion (A) as that used in Example 1, a slurry of the same type as that prepared in Example 1 was prepared.

In addition, following the procedure of Example 1, 5 parts of dioctyl phthalate, 10 parts of toluene and 5 parts of xylene were added to 40 parts of the resinous tackifier to prepare a resin solution. After controlling the temperature of the resin solution below 70° C., "Emulgen 920", as in Example 7, was added in an amount of 5 parts, followed by the further addition of 20 parts of water while stirring the resin solution thoroughly. In the course of the above addition of water, the liquid phase underwent a phase transition from W/O to O/W to provide an emulsion of the resinous tackifier.

Then, 85 parts of the above emulsion of the resinous tackifier were added to 190 parts of the above-prepared slurry, followed by the addition of 0.5 parts by weight of a cellulose-base thickening agent. The resultant mixture was stirred thoroughly. Finally, a 10% aqueous solution of caustic soda was added to thicken the slurry, thereby obtaining a tile adhesive having a viscosity of 14,500 poises and a non-volatile content, inclusive of the resin components, of 69%.

The tile adhesive was evaluated in the same manner as in Example 1.

COMPARATIVE EXAMPLE 2

As in Example 4, 50 parts of "Hi-Rez", 10 parts of the naphthene oil, 15 parts of toluene and 5 parts of xylene were added together and then stirred under heat to prepare a resin solution. Seven parts of "Emulgen 920", as in Example 7, were then added to 80 parts of the resin solution while maintaining the temperature of the resin solution below 70° C. Thereafter, 24 parts of water were added with thorough stirring a provide an emulsion of the resinous tackifier.

Added to 100 parts of the same acrylic emulsion as that obtained in Example 4 were 110 parts of calcium carbonate. The resulting mixture was stirred thoroughly to prepare a slurry. To 210 parts of the slurry, were added 119 parts of the above-prepared emulsion and then 0.3 part of a cellulose-base thickening agent. The resultant mixture was stirred well, followed finally by the addition of a 10% aqueous solution of caustic soda to thicken the mixture and to obtain a tile adhesive having a viscosity of 12,500 poises and a non-volatile content, inclusive of the resin components, of 69%.

COMPARATIVE EXAMPLES 3 and 4

In order to compare current market products, Commercial Product A containing a synthetic rubber latex as its base component and Commercial Product B formed principally of an acrylic emulsion were evaluated in the same manner as in Example 1. According to an analysis made by the present inventors, Commercial Product A and Commercial Product B were found to contain surfactants in the amounts given in Table 1'.

TABLE 1

| | Example No. | | | | | |
|---|---|---|---|---|---|---|
| | 1 | | 2 | | 3 | |
| Component (A) | ST/BD = 45/55 (by weight ratio) | | ST/BD = 45/55 (by weight ratio) | | MMT/BD = 50/50 (by weight ratio) | |
| | Acrylic acid | 2% | Acrylic acid | 2% | Itaconic acid | 1.5% |
| | Resin content | 50% | Resin content | 50% | Resin content | 50% |
| Component (B) (parts) | Calcium carbonate | 90 | Calcium carbonate | 90 | Calcium carbonate | 20 |
| | | | | | Asbestos | 67 |
| Component (C) (parts) | Hi-Resin | 40 | Hi-Resin | 40 | Hi-Resin | 40 |
| | DOP | 5 | DOP | 5 | DOP | 5 |
| | Toluene | 10 | Toluene | 10 | Toluene | 10 |
| | Xylene | 5 | Xylene | 5 | Xylene | 5 |
| Composition (parts) | | | | | | |
| (A) | 100 | | 100 | | 100 | |
| (B) | 90 | | 90 | | 87 | |
| (C) | 60 | | 60 | | 51 | |
| Water | 15 | | 15 | | — | |
| TOTAL | 265 | | 265 | | 238 | |
| Non-volatile content (%) | 70 | | 70 | | 73 | |

TABLE 1-continued

| Viscosity (poises) | 16,000 | 15,800 | 16,800 |
|---|---|---|---|

| | Example No. | | | |
|---|---|---|---|---|
| | 4 | 5 | 6 | 7 |
| Component (A) | 2-EHA 60 parts<br>MMA 35.5 parts<br>N—MAM 2 parts<br>Acrylic acid 2 parts<br>Emulsifier 0.5 parts<br>Resin content 45% | BA 65 parts<br>ST 30<br>N—MAM 2<br>Acrylic amide 1<br>Acrylic acid 2<br>Resin content 45% | 2-EHA 59 parts<br>Vinyl acetate 35<br>N—MAM 2<br>DVB 0.5<br>Acrylic acid 3<br>HEA 0.5<br>Resin content 45% | 2-EHA 59 parts<br>Vinyl acetate 35<br>N—MAM 2<br>DVB 0.5<br>Acrylic acid 3<br>HEA 0.5<br>Resin content 45% |
| Component (B) (parts) | Calcium carbonate 110 | Calcium carbonate 100 | Calcium carbonate 120 | Calcium carbonate 120 |
| Component (C) (parts) | Hi-Rez 50<br>Sunsen 450 10<br>Toluene 15<br>Xylene 5 | Hi-Rez 50<br>Sunsen 450 10<br>Toluene 15<br>Xylene 5 | Tack Ace 50<br>Sunsen 450 5<br>Toluene 15<br>Xylene 10 | Tack Ace 50<br>Sunsen 450 5<br>Toluene 15<br>Xylene 10 |
| Composition (parts) | | | | |
| (A) | 100 | 100 | 100 | 100 |
| (B) | 110 | 100 | 120 | 120 |
| (C) | 80 | 80 | 80 | 80 |
| Water | 18 | 20 | 24 | 24 |
| | | | | 30% "Emulgen 920" aq. 1 |
| TOTAL | 308 | 300 | 324 | 325 |
| Non-volatile content (%) | 70 | 68 | 69 | 68 |
| Viscosity (poises) | 12,000 | 13,500 | 14,000 | 13,500 |

| | Comp. Example No. | | | |
|---|---|---|---|---|
| | 1 | 2 | 3 | 4 |
| Component (A) | Same as Example 1 | Same as Example 4 | Commercial product A (synthetic rubber latex type) | Commercial product B (Acrylic emulsion type) |
| Component (B) | Same as Example 1 | Same as Example 4 | | |
| Component (C) (parts) | Hi-Resin 40<br>DOP 5<br>Toluene 10<br>Xylene 5<br>Emulgen 920 5<br>Water 20<br>TOTAL 85 | Hi-Rez 50<br>Sunsen 450 10<br>Toluene 15<br>Xylene 5<br>Emulgen 920 7<br>Water 24<br>TOTAL 111 | | |
| Composition (parts) | | | | |
| (A) | 100 | 100 | | |
| (B) | 90 | 110 | | |
| (C) | 85 | 111 | | |
| TOTAL | 275 | 321 | | |
| Non-volatile content (%) | 69 | 69 | 72 | 70 |
| Viscosity (poises) | 14,500 | 12,500 | 17,300 | 16,500 |
| Amount of surfactant (%) | 1.8 | 2.2 | 2.3 | 1.8 |

TABLE 2

| | Example | | | | | | | Comparative Example | | | |
|---|---|---|---|---|---|---|---|---|---|---|---|
| | 1 | 2 | 3 | 4 | 5 | 6 | 7 | 1 | 2 | 3 | 4 |
| Type of aqueous emulsion | SBR | SBR | MBR | Acrylic | Acrylic | Acrylic | Acrylic | SBR | Acrylic | Synthetic rubber | Acrylic |
| 1. Adhesion strength after immersed in water (8 mm slate base) (kgf/cm$^2$) | 2.80 | 2.95 | 2.40 | 3.35 | 3.55 | 3.18 | 3.22 | 0.96 | 1.28 | 0.73 | 1.32 |
| 2. Setting strength (mortar base) (kgf/cm$^2$) | | | | | | | | | | | |
| (a) 4 days of mortar aging | 1.2 | 1.3 | 1.7 | 2.4 | 1.9 | 1.7 | 1.9 | Re-emulsified* | 0–0.8 | Re-emulsified* | 0–0.1 |
| (b) 7 days of mortar aging | 2.1 | 1.9 | 2.0 | 2.8 | 2.6 | 2.6 | 2.3 | 0.1–0.5 | 0.3–1.0 | 0–0.5 | 0.3–1.2 |

*"Re-emulsified" means a state in which, in the present evaluation test, the adhesive layer looked dry to the eye after being aged for 2 weeks in a room at 20° C. following the application of tile, but part of the adhesive reconverted to initial emulsion droplets when immersed in water for 1 week following the above 2-week aging. This phenomenon was observed at a central part of the adhesive under a slowly-drying tile.

As is apparent from the above results, distinct differences are observed in waterproofness and adhesion force and in final adhesive strength between adhesives prepared by mixing their components in the presence of a great deal of a surfactant and those obtained in accordance with the present invention wherein a resinous tackifier, filler and aqueous emulsion are mixed without a surfactant or with a surfactant in the amount of 0.5% or less.

What is claimed is:

1. An emulsion adhesive composition for ceramic tiles, which composition comprises:
   (a) an aqueous emulsion selected from a synthetic rubber latex or an acrylic emulsion, said emulsion containing 40-65% by weight of the resin component;
   (b) a filler in an amount of 50-350 parts by weight on a solid basis per 100 parts by weight on a solid basis to the aqueous emulsion; and
   (c) a resin solution in an amount of 20-250 parts by weight on a non-volatile component basis per 100 parts by weight on a solid basis of the aqueous emulsion, said resin solution containing a resinous tackifier dissolved in a solvent and/or plasticizer; said composition containing 0.5% by weight or less of a surfactant based on the amount of the composition.

2. An adhesive composition as claimed in claim 1, wherein the filler is an inorganic filler or organic fibrous filler.

3. An adhesive composition as claimed in claim 2, wherein the inorganic filler is calcium carbonate, clay, talc or asbestos.

4. An adhesive composition as claimed in claim 1, wherein the resinous tackifier is rosin, a modified rosin or a derivative thereof, a polyterpene resin, a modified terpene, an aliphatic hydrocarbon resin, an aromatic hydrocarbon resin, a phenol resin, a xylene resin or a coumarone-indene resin.

5. An adhesive composition as claimed in claim 4, wherein the resinous tackifier is formed in combination of two or more of rosin, modified rosins and derivatives thereof, polyterpene resins, modified terpenes, aliphatic hydrocarbon resins, aromatic hydrocarbon resins, phenol resins, xylene resins and coumarone-indene resins, and has a softening point of 80° C.-130° C.

6. An adhesive composition as claimed in claim 1, wherein the plasticizer is a phthalic acid ester, a polyester-base plasticizer, a petroleum fraction or residue of a high boiling point, or a styrene-xylene copolymer.

7. An adhesive composition as claimed in claim 1, wherein the solvent is an aromatic solvent such as benzene, toluene or xylene, a naphthenic solvent, a paraffinic solvent, a ketone, or an ester.

8. An adhesive composition as claimed in claim 1, wherein the filler is contained in an amount of 150-350 parts by weight and the resinous tackifier is contained in an amount of 25-200 parts by weight, per 100 parts by weight of the aqueous emulsion.

9. An adhesive composition as claimed in claim 1, wherein the resinous tackifier is contained in an amount of 12-150 parts by weight per 100 parts by weight of the aqueous emulsion.

10. An adhesive composition as claimed in claim 1, further comprising a silane-base coupling agent.

11. An emulsion adhesive composition for ceramic tiles, which composition comprises:
    (a) an aqueous emulsion selected from a synthetic rubber or an acrylic emulsion, said emulsion containing 40-65% by weight of the resin component,
    (b) an inorganic filler selected from calcium carbonate, clay, talc or asbestos in an amount of 50-350 parts by weight on a solid basis per 100 parts by weight on a solid basis for the aqueous emulsion, and
    (c) a resin solution in an amount of 20-250 parts by weight on the non-volatile component basis per 100 parts by weight on a solid basis for the aqueous emulsion, said resin solution containing at least one resinous tackifier selected from rosin, modified rosins and derivatives thereof, polyterpene resins, modified terpenes, aliphatic hydrocarbon resins, aromatic hydrocarbon resins, phenol resins, xylene resins and coumarone-indene resins, and had a sofenting point of 80° C.-130° C., said tackifier being dissolved in a solvent and/or plasticizer, said composition containing 0.5% by weight of less of a surfactant based on the amount of the composition.

12. An emulsion adhesive composition as claimed in claim 11, wherein the plasticizer is a phthalic acid ester, a polyester-base plasticizer, a petroleum fraction or residue of a high boiling point, or a styrene-xylene copolymer.

13. An emulsion adhesive composition as claimed in claim 11, wherein the solvent is an aromatic solvent such as benzene, toluene or xylene, a naphthenic solvent, a ketone, or an ester.

14. An emusion adhesive composition as claimed in claim 11, wherein the resinous tackifier is contained in an amount of 12-150 parts by weight per 100 parts by weight of the aqueous emulsion.

15. An emulsion adhesive composition as claimed in claim 11, wherein it further comprises a silane-base coupling agent.

16. An emulsion adhesive composition as claimed in claim 1, wherein the synthetic resin is a styrene-butadiene synthetic rubber latex or a methacrylate-butadiene synthetic rubber latex.

17. An emulsion adhesive composition as claimed in claim 1, wherein the acrylic emulsion contains a copolymer of at least two monomers selected from acrylic acid, esters thereof, methacrylic acid or esters thereof, of a copolymer of acrylic acid, esters thereof, methacrylic acid or esters thereof with a monomer copolymerizable therewith.

18. An emulsion adhesive composition as claimed in claim 11, wherein the synthetic resin is a styrene-butadiene synthetic rubber latex or a methacrylate-butadiene synthetic rubber latex.

19. An emulsion adhesive composition as claimed in claim 11, wherein the acrylic emulsion contains a copolymer of at least two monomers selected from acrylic acid, esters thereof, metharylic acid or esters thereof, or a copolymer of acrylic acid, esters thereof, methacrylic acid of esters thereof with a monomer copolymerizable therewith.

* * * * *